United States Patent
McNally et al.

(10) Patent No.: US 8,477,031 B2
(45) Date of Patent: Jul. 2, 2013

(54) COMMUNICATION PORT IDENTIFICATION SYSTEM

(75) Inventors: John M. McNally, Chicago, IL (US);
Shahriar B. Allen, Naperville, IL (US);
Satish I. Patel, Roselle, IL (US)

(73) Assignee: Panduit Corp., Tinley Park, IL (US)

( * ) Notice: Subject to any disclaimer, the term of this patent is extended or adjusted under 35 U.S.C. 154(b) by 504 days.

(21) Appl. No.: 12/738,042

(22) PCT Filed: Oct. 17, 2008

(86) PCT No.: PCT/US2008/080312
§ 371 (c)(1),
(2), (4) Date: Jun. 25, 2010

(87) PCT Pub. No.: WO2009/052381
PCT Pub. Date: Apr. 23, 2009

(65) Prior Publication Data
US 2010/0267274 A1    Oct. 21, 2010

Related U.S. Application Data

(60) Provisional application No. 60/981,353, filed on Oct. 19, 2007.

(51) Int. Cl.
*G08B 13/12* (2006.01)
(52) U.S. Cl.
USPC ........ 340/568.2; 340/635; 340/653; 340/687; 340/815.45; 439/488; 439/489
(58) Field of Classification Search
USPC .............. 340/657, 635, 687, 815.4, 815.45, 340/568.2, 653, 686.4; 439/49, 488, 489, 439/490, 491, 676, 9; 324/537, 538; 361/119
See application file for complete search history.

(56) References Cited

U.S. PATENT DOCUMENTS 3,052,842 A    9/1962    Frohman et al.
3,573,789 A    4/1971    Sharp et al.
(Continued)

FOREIGN PATENT DOCUMENTS

EP    0297079 B1    3/1992
EP    0575100 B1    12/1993
(Continued)

OTHER PUBLICATIONS

"Finding the Missing Link," Cabling Installation & Maintenance, Jun./Jul. 2002.
(Continued)

*Primary Examiner* — Hung T. Nguyen
(74) *Attorney, Agent, or Firm* — Robert A. McCann; Christopher S. Clancy; Yuri Astvatsaturov

(57) ABSTRACT

A communication port identification system enables an intelligent interconnect patch panel to reliably track connections to network switches. Network switch ports are provided with port ID modules that are inserted into the ports. Intelligent interconnect patch cords each utilize a patch cord microcontroller and out-of-band conductors to enable communication between an intelligent interconnect patch panel and the port ID modules of the switch port. Each port ID module is provided with a unique identification number, and the intelligent interconnect patch panel is thereby able to track all of its connections to the port ID modules in real time, and to update a network management system accordingly.

10 Claims, 17 Drawing Sheets

U.S. PATENT DOCUMENTS

| | | |
|---|---|---|
| 3,573,792 A | 4/1971 | Reed |
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |
| 4,169,220 A | 9/1979 | Fields |
| 4,196,316 A | 4/1980 | McEowen et al. |
| 4,517,619 A | 5/1985 | Uekubo |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |
| 4,890,102 A | 12/1989 | Oliver |
| 4,901,004 A | 2/1990 | King |
| 4,937,529 A | 6/1990 | O'Toole, III et al. |
| 4,937,835 A | 6/1990 | Omura |
| 5,037,167 A | 8/1991 | Beaty |
| 5,081,627 A | 1/1992 | Yu |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,170,327 A | 12/1992 | Burroughs |
| 5,204,929 A | 4/1993 | Machall et al. |
| 5,222,164 A | 6/1993 | Bass, Sr. et al. |
| 5,226,120 A | 7/1993 | Brown et al. |
| 5,233,501 A | 8/1993 | Allen et al. |
| 5,265,187 A | 11/1993 | Morin et al. |
| 5,270,658 A | 12/1993 | Epstein |
| 5,305,405 A | 4/1994 | Emmons et al. |
| 5,353,367 A | 10/1994 | Czosnowski et al. |
| 5,375,028 A | 12/1994 | Fukunaga |
| 5,394,503 A | 2/1995 | Dietz, Jr. et al. |
| 5,432,847 A | 7/1995 | Hill et al. |
| 5,459,478 A | 10/1995 | Bolger et al. |
| 5,463,706 A | 10/1995 | Dumont et al. |
| 5,483,467 A | 1/1996 | Krupka et al. |
| 5,487,666 A | 1/1996 | DiGiovanni |
| 5,521,902 A | 5/1996 | Ferguson |
| 5,532,603 A | 7/1996 | Bottman |
| 5,541,586 A | 7/1996 | Wise |
| 5,546,282 A | 8/1996 | Hill et al. |
| 5,550,755 A | 8/1996 | Martin et al. |
| 5,583,874 A | 12/1996 | Smith et al. |
| 5,666,453 A | 9/1997 | Dannenmann |
| 5,684,796 A | 11/1997 | Abidi et al. |
| 5,726,972 A | 3/1998 | Ferguson |
| 5,727,055 A | 3/1998 | Ivie et al. |
| 5,754,112 A | 5/1998 | Novak |
| 5,764,043 A | 6/1998 | Czosnowski et al. |
| 5,790,041 A | 8/1998 | Lee |
| 5,832,071 A | 11/1998 | Voelker |
| 5,847,557 A | 12/1998 | Fincher et al. |
| 5,854,824 A | 12/1998 | Bengal et al. |
| 5,870,626 A | 2/1999 | Lebeau |
| 5,876,240 A | 3/1999 | Derstine et al. |
| 5,878,030 A | 3/1999 | Norris |
| 5,892,756 A | 4/1999 | Murphy |
| 5,898,837 A | 4/1999 | Guttman et al. |
| 5,915,993 A | 6/1999 | Belopolsky et al. |
| 5,923,663 A | 7/1999 | Bontemps et al. |
| 5,944,535 A | 8/1999 | Bullivant et al. |
| 6,002,331 A | 12/1999 | Laor |
| 6,067,014 A | 5/2000 | Wilson |
| 6,078,113 A | 6/2000 | True et al. |
| 6,086,415 A | 7/2000 | Sanchez et al. |
| 6,094,261 A | 7/2000 | Contarino, Jr. |
| 6,168,555 B1 | 1/2001 | Fetterleigh et al. |
| 6,175,865 B1 | 1/2001 | Dove et al. |
| 6,222,908 B1 | 4/2001 | Bartolutti et al. |
| 6,229,538 B1 | 5/2001 | McIntyre et al. |
| 6,234,830 B1 | 5/2001 | Ensz et al. |
| 6,243,510 B1 | 6/2001 | Rauch |
| 6,285,293 B1 | 9/2001 | German et al. |
| 6,330,307 B1 | 12/2001 | Bloch et al. |
| 6,350,148 B1 | 2/2002 | Bartolutti et al. |
| 6,381,283 B1 | 4/2002 | Bhardwaj et al. |
| 6,421,322 B1 | 7/2002 | Koziy et al. |
| 6,424,710 B1 | 7/2002 | Bartolutti et al. |
| 6,434,716 B1 | 8/2002 | Johnson et al. |
| 6,437,894 B1 | 8/2002 | Gilbert et al. |
| 6,453,014 B1 | 9/2002 | Jacobson et al. |
| 6,456,768 B1 | 9/2002 | Boncek et al. |
| 6,499,861 B1 | 12/2002 | German et al. |
| 6,522,737 B1 | 2/2003 | Bartolutti et al. |
| 6,543,941 B1 | 4/2003 | Lampert |
| 6,561,827 B2 | 5/2003 | Frostrom et al. |
| 6,574,586 B1 | 6/2003 | David et al. |
| 6,577,243 B1 | 6/2003 | Dannenmann et al. |
| 6,588,938 B1 | 7/2003 | Lampert et al. |
| 6,601,097 B1 | 7/2003 | Cheston et al. |
| 6,626,697 B1 | 9/2003 | Martin et al. |
| 6,629,269 B1 | 9/2003 | Kahkoska |
| 6,684,179 B1 | 1/2004 | David |
| 6,688,910 B1 | 2/2004 | Macauley |
| 6,714,698 B2 | 3/2004 | Pfeiffer et al. |
| 6,725,177 B2 | 4/2004 | David et al. |
| 6,750,643 B2 | 6/2004 | Hwang et al. |
| 6,778,911 B2 | 8/2004 | Opsal et al. |
| 6,784,802 B1 | 8/2004 | Stanescu |
| 6,798,944 B2 | 9/2004 | Pfeiffer et al. |
| 6,802,735 B2 | 10/2004 | Pepe et al. |
| 6,823,063 B2 | 11/2004 | Mendoza |
| 6,857,897 B2 | 2/2005 | Conn |
| 6,871,156 B2 | 3/2005 | Wallace et al. |
| 6,894,480 B2 | 5/2005 | Back |
| 6,898,368 B2 | 5/2005 | Colombo et al. |
| 6,905,363 B2 | 6/2005 | Musolf et al. |
| 6,906,505 B2 | 6/2005 | Brunet et al. |
| 6,975,242 B2 | 12/2005 | Dannenmann et al. |
| 6,992,491 B1 | 1/2006 | Lo et al. |
| 7,005,861 B1 | 2/2006 | Lo et al. |
| 7,027,704 B2 | 4/2006 | Frohlich et al. |
| 7,028,087 B2 | 4/2006 | Caveney |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,068,043 B1 | 6/2006 | Lo et al. |
| 7,068,044 B1 | 6/2006 | Lo et al. |
| 7,160,143 B2 | 1/2007 | David et al. |
| 7,207,846 B2 | 4/2007 | Caveney et al. |
| 7,234,944 B2 * | 6/2007 | Nordin et al. .................. 439/49 |
| 7,605,707 B2 | 10/2009 | German et al. |
| 8,197,280 B2 * | 6/2012 | Caveney et al. .............. 439/489 |
| 2002/0069277 A1 | 6/2002 | Caveney |
| 2002/0071394 A1 | 6/2002 | Koziy et al. |
| 2002/0090858 A1 | 7/2002 | Caveney |
| 2002/0116485 A1 | 8/2002 | Black et al. |
| 2003/0061393 A1 | 3/2003 | Steegmans et al. |
| 2003/0073343 A1 | 4/2003 | Belesimo |
| 2003/0152087 A1 | 8/2003 | Shahoumian et al. |
| 2004/0044599 A1 | 3/2004 | Kepner et al. |
| 2004/0052471 A1 | 3/2004 | Colombo et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0219827 A1 | 11/2004 | David et al. |
| 2005/0052174 A1 | 3/2005 | Angelo et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0186819 A1 | 8/2005 | Velleca et al. |
| 2005/0195584 A1 | 9/2005 | AbuGhazaleh et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |
| 2006/0057876 A1 | 3/2006 | Dannenmann et al. |
| 2006/0148279 A1 | 7/2006 | German et al. |
| 2006/0282529 A1 | 12/2006 | Nordin et al. |
| 2007/0032124 A1 | 2/2007 | Nordin et al. |
| 2007/0132503 A1 | 6/2007 | Nordin |

FOREIGN PATENT DOCUMENTS

| | | |
|---|---|---|
| EP | 0745229 B1 | 3/2003 |
| EP | 1788825 A2 | 5/2007 |
| FR | 2680067 A1 | 2/1993 |
| GB | 2236398 A | 4/1991 |
| GB | 2347751 A | 9/2000 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 2004044599 A2 | 3/2004 |
| WO | 2005072156 A2 | 8/2005 |
| WO | 2006052686 A1 | 5/2006 |

OTHER PUBLICATIONS

"IntelliMAC—The New Intelligent Cable Management Solution by ITRACS & NORDX/CDT," Press Release 2003.

"RiT Technologies Ltd. SMART Cabling System," RiT Technologies Ltd., 2004.

"Ortronics Launches iTRACS—Ready Structured Cabling Solutions," News Release Mar. 7, 2003.

"The Systimax iPatch System—Intelligent yet simple patching...", CommScope, Inc., 2004.

"White Paper—intelligent Patching." David Wilson, Nov. 2002.

"PatchView for the Enterprise (PV4E) technical backround/Networks for Business," Jun. 24-26, 2003.

"RiT Technologies Ltd. Go Patch-less," May 2000 Edition of Cabling Systems.

"Molex Premise Networks/Western Europe-Real Time Patching System" Molex Prem. Networks, 2001.

"EC&M Taking Note of Patch Panel Technology," Mark McElroy, Jun. 1, 1998.

Intelligent Patching SMARTPatch for the Enterprise; 8 pages; Oct. 18, 2007.

Product of the Week—Molex's Real Time Patching System; 3 pages; Oct. 13, 2004.

Brand Rex Network solutions Access racks Cat5E 6 cabling UK; 6 pages; Oct. 20, 2004.

Intelligent Cable Mangement Systems—Hot Topics—Trescray; 2 pages; Oct. 20, 2004.

* cited by examiner

COMMUNICATION PORT IDENTIFICATION SYSTEM

RELATED APPLICATION

The present application is a 371 application of PCT/US08/80312 filed Oct. 17, 2008 which claims the benefit of 60/981,353 filed Oct. 19, 2007. The present application incorporates by reference in their entireties U.S. patent application Ser. No. 11/265,316, entitled "Method and Apparatus for Patch Panel Patch Cord Documentation and Revision," filed Nov. 2, 2005, U.S. Pat. No. 7,297,018; and U.S. patent application Ser. No. 11/560,112, entitled "Smart Cable Provisioning for a Patch Cord Management System," filed Nov. 15, 2006, U.S. Pat. No. 7,811,119.

BACKGROUND OF THE INVENTION

Patch panels are used in communications networks as intermediate elements between horizontal cabling (to which endpoint devices such as computers and telephones are connected) and network switches. When physical connections between endpoint devices and network switches are moved, added, or changed, patch panels are typically the points at which technicians complete the required moves, additions, or changes. It is important to keep track of changes that are made to patch cord connections within the patch field. Proper documentation of changes in the patch field assures that the routing of patch cords is always known and further assures that any future changes are completed correctly.

In interconnect network configurations, one patch panel is placed between the horizontal cabling and the network switch. In an interconnect configuration, the documentation of patch cord connections between the patch panel and the switch will provide the necessary documentation and monitoring of connections between the switch and the horizontal cabling. It is desirable to have a patch cord management system that enables complete documentation and monitoring of patch cord connections and that guides network installers as they make moves, adds, or changes to the patch cord connections. It is also desirable for a patch cord management system to have a minimal impact on existing networks.

State-of-the-art patch cord documentation systems for interconnect applications require the addition of contact plates on printed circuit boards which are fastened to the front of switches and which have cables that connect the printed circuit boards to monitoring systems. The monitoring systems scan $9^{th}$ wire connections between the switch contact plates and contact plates on the front of an associated patch panel. This is typically a retrofit installation which requires a variety of parts due to the variety of switch configurations.

There is a need for an improved port identification system which works with a patch panel to identify ports, such as switch ports, in a communications network. Such a system should be easy to install and compact, while providing port identification functionality without delays.

SUMMARY OF THE INVENTION

According to one embodiment of the present invention, port ID modules are installed in the ports of a network switch. An intelligent interconnect patch panel, which is connected to the network switch, is adapted for use with intelligent interconnect patch cords and the port ID modules to enable the management of connections between the intelligent interconnect patch panel and the network switch.

Port ID modules are provided with unique identification numbers within port ID module circuitry.

Port ID modules according to the present invention may be removed and disabled with the use of a removal tool.

DETAILED DESCRIPTION OF THE ILLUSTRATED EMBODIMENT

Figure 1:
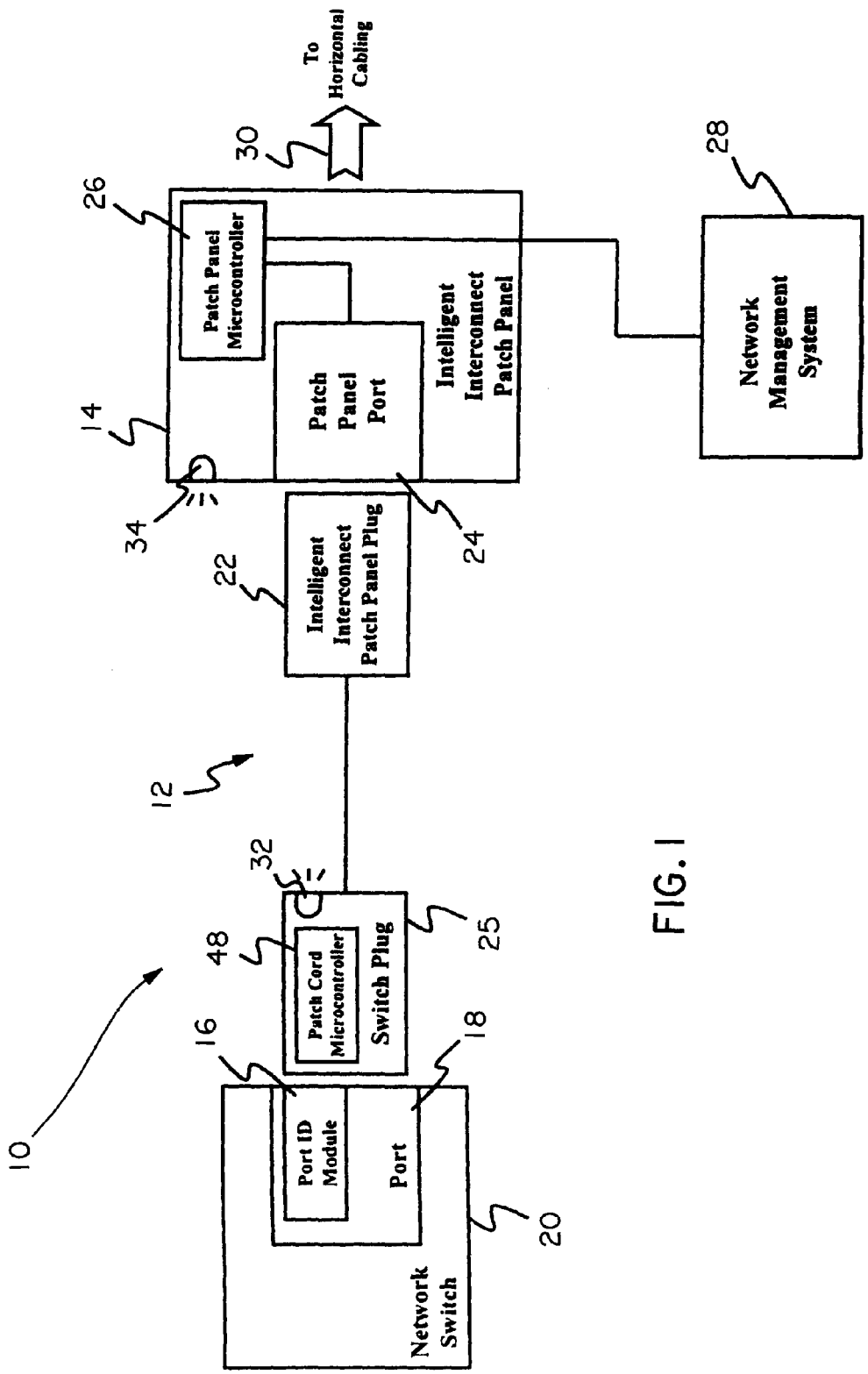
FIG. 1 is a schematic block diagram showing components and communication connections of a switch port identification system.

FIG. 1 is a block diagram showing system elements in a network switch port identification system 10. The port identification system 10 uses intelligent interconnect patch cords 12, intelligent interconnect patch panels 14, and port ID modules 16 within ports 18 of a network switch 20 to enable the management of connections in a communications network. Systems and methods according to the present invention may be used to guide a network technician during the movement, addition, or change ("MAC") of an intelligent interconnect patch cord 12. Systems and methods according to the present invention may also be used to automatically identify and track current connections within a network.

The intelligent interconnect patch panel 14 is connected to horizontal cabling as shown by arrow 30, and the horizontal cabling, in turn, is connected to specific network devices such as VOIP phones and computers. Although FIG. 1 shows only one connection, it is to be understood that several connections using intelligent interconnect patch cords 12 are provided between an intelligent interconnect patch panel 14 and a network switch 20.

In the port identification system 10, an intelligent interconnect patch panel plug 22 of an intelligent interconnect patch cord 12 is inserted into a patch panel port 24, and a switch plug 25 of the patch cord 12 is inserted into a port 18 of the network switch 20. The port 18 of the network switch 20 has a port ID module 16 installed therein. The port ID module 16 is provided with a unique identification code and circuitry for interfacing with the intelligent interconnect patch cord 12, allowing the unique identification code corresponding to the port 18 to be received by the patch panel microcontroller 26 of the intelligent interconnect patch panel 14. With this information, the intelligent interconnect patch panel 14 can update a network management system 28 with information regarding changes to connections in the network in real time.

Systems and methods according to the present invention allow for the guidance of cable moves, adds, and changes, through the use of plug LEDs 32 on the intelligent interconnect patch cord 12 and LEDs 34 associated with ports 24 of the intelligent interconnect patch panel 14.

Figure 2:
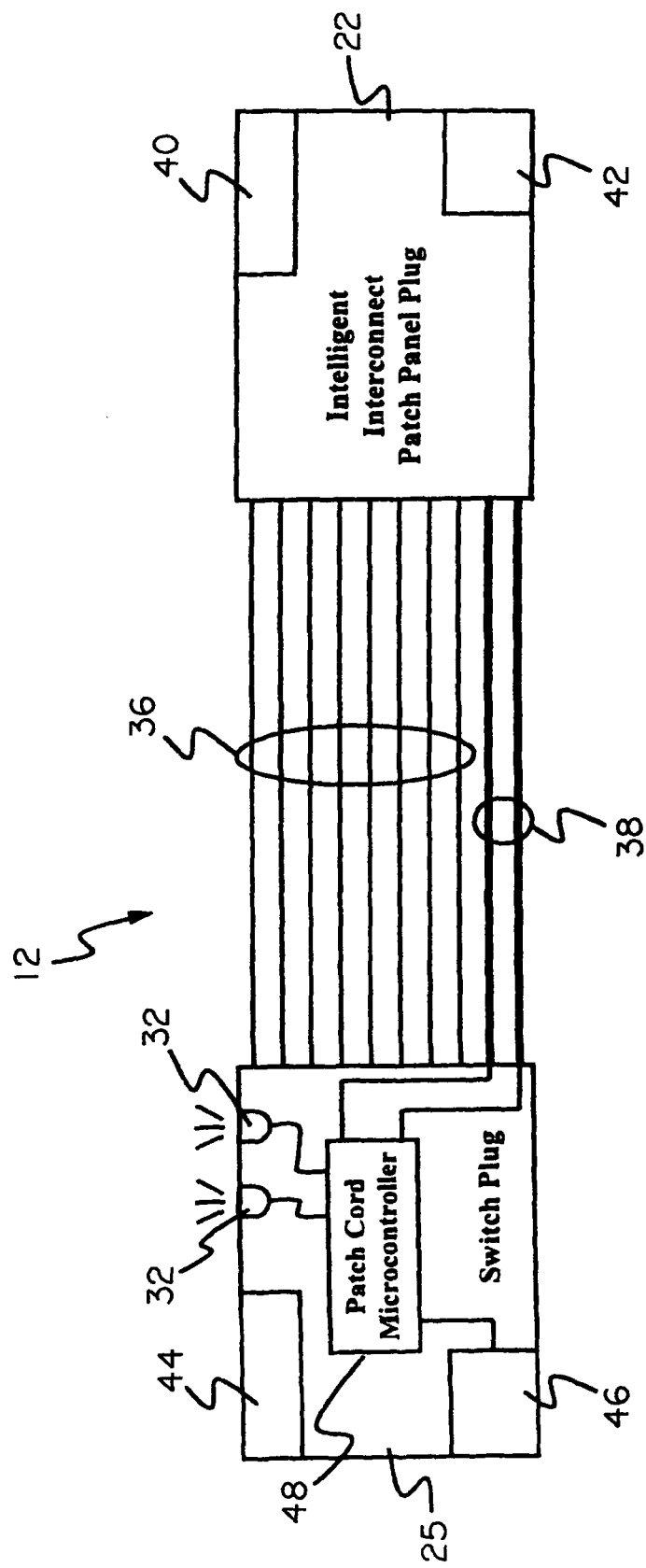
FIG. 2 is a schematic block diagram of an intelligent interconnect patch cord according to one embodiment of the present invention.

FIG. 2 is a schematic diagram of an intelligent interconnect patch cord 12 according to one embodiment of the present invention. The intelligent interconnect patch cord 12 has four pairs of standard "in-band" conductors 36 for network communications and two "out-of-band" conductors 38 that support the functions of the present invention.

The intelligent interconnect patch panel plug 22 is connected to an intelligent interconnect patch panel 14. The four pairs of in-band conductors, 36, are connected via in-band contacts 40 to an intelligent interconnect patch panel 14 in the standard way (e.g., an RJ-45-compatible contact configuration). The two out-of-band conductors 38 are connected to an intelligent interconnect patch panel 14 with an integral connector holding intelligent interconnect patch panel plug contacts 42.

Referring now to FIGS. 1 and 2, the switch plug 25 is connected to a switch port 18. The four pairs of in-band conductors, 36, are connected via in-band contacts 44 to contacts within the switch port 18, similarly to the intelligent interconnect patch panel plug 22. When the plug 25 is installed, the two out-of-band conductors 38 are electrically connected by port ID module plug contacts 46 (which may be plates or spring contacts) on the plug 25 to a port ID module 18 which has been installed (for example, by snapping-in) into the switch port 18. The port ID module 18 is an ID chip carrier which remains in a port and identifies the port.

Referring to FIGS. 1 and 2, in one embodiment of the present invention, the intelligent interconnect patch panel 14 is capable of detecting the presence of an intelligent interconnect patch cord 12, and in turn the presence of a port ID module 16, using digital signaling techniques.

When an intelligent interconnect patch cord 12 is plugged into a patch panel port 24 of the intelligent interconnect patch panel 14, the out-of-band conductors 38 (shown in FIG. 2) are connected through contacts 42 of the intelligent interconnect patch panel plug 22 to a patch panel microcontroller 26 in the intelligent interconnect patch panel 14. This completes a two-conductor connection to a patch cord microcontroller 48 in the switch plug 25 of the intelligent interconnect patch cord.

This enables what is known in the art as a "one wire" serial communication in either direction between the microcontrollers, and it also provides DC voltage to the patch cord microcontroller 48.

When the switch plug 25 is connected to a switch port 18 that contains a port ID module 16, two conductors of the switch plug are connected through port ID module contacts to an ID chip in the port ID module 16. This enables one-wire serial communication between the patch cord microcontroller 48 and the ID chip in the port ID module 16. During normal operation, this serial digital communication occurs constantly (repeating, for example, at less-than-200 millisecond intervals) and communicates to the patch cord microcontroller 48 the ID of the port 18 to which the switch plug is connected. If a port ID module is disabled, there is a short circuit across the ID chip and hence across these two conductors, which is detected by the patch cord microcontroller 48. If a switch plug is disconnected or if there is no port ID module in a switch port, there is an open circuit across the two switch plug conductors, and this open circuit is detected by the patch cord microcontroller 48.

The patch cord microcontroller 48 continuously communicates (e.g., at less-than-200 millisecond intervals) the insertion or removal status of the switch plug and, if inserted, the ID of a port ID module 16 to the intelligent interconnect patch panel microcontroller 26. The patch cord microcontroller 48 will also energize LEDs 32 in the switch plug 25 upon receipt of communication signals from the intelligent interconnect patch panel microcontroller 26, which are intermixed with other function signals from the patch cord microcontroller 48 to the intelligent interconnect patch panel microcontroller 26.

The patch cord microcontroller 48 may include a unique identification number for each intelligent interconnect patch cord 14. This can enable additional information to be acquired by the intelligent interconnect patch panel. For example, if each intelligent interconnect patch cord 12 has a unique ID number, the intelligent interconnect patch panel 12 can inform the NMS 28 when a patch cord has been replaced in the system.

Using this system, if an intelligent interconnect patch cord 12 is connected to a switch port having a port ID module, a unique port ID number corresponding to the switch port into which the cord has been installed is immediately transmitted to the intelligent interconnect patch panel 14. If the power to an intelligent interconnect patch panel 14 was off, the port ID number is immediately transmitted to the intelligent interconnect patch panel 14 when the power is restored. The network management system 28 is therefore always current for each active switch port.

According to one embodiment, an intelligent interconnect patch cord 12 is supplied with a port ID module 16 installed on the switch plug 25. When the switch plug 25 is installed in a switch port, the port ID module 16 is automatically installed in the switch port 25. The switch plug 25 can be removed; however, under normal circumstances, the port ID module 16 will remain installed in a switch port 18 for the life of a switch. As shown in figures below, a port ID module can be removed with a port ID removal tool; however, in the process, the port ID module is permanently disabled.

Figure 3:
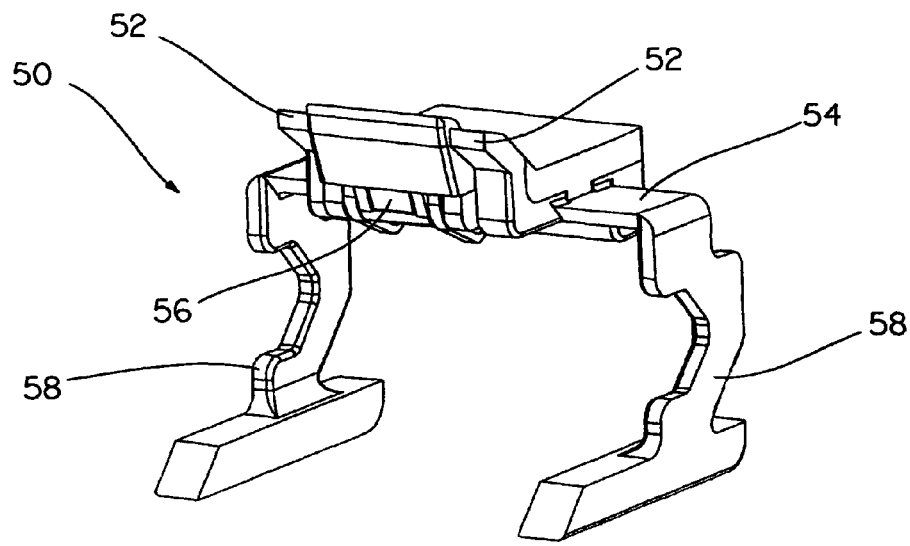
FIGS. 3 and 4 are perspective diagrams of a port ID module according to one embodiment of the present invention.

FIG. 3 shows a port ID module 50 according to one embodiment of the present invention. The port ID module 50 is adapted for insertion into an RJ-45 port. The port ID module 50 has latches 52 that lock the port ID module 50 into an RJ-45 port, but flex during installation, thereby allowing installation to be done using the plug 25 on the intelligent interconnect patch cord 12. Crossbeams 54 allow the port ID module 50 to rotate downwardly during the removal process.

A slider 56 is flush with the front face of the port ID module and, as described below, eliminates the possibility of tampering or removing the port ID module 50 without disabling the module. Legs 58 are designed to collapse similarly to springs and take up gaps between the opening of a switch port and the port ID module. This makes it difficult to remove the port ID module 50 without the use of a specially designed removal tool, described below.

Figure 4:
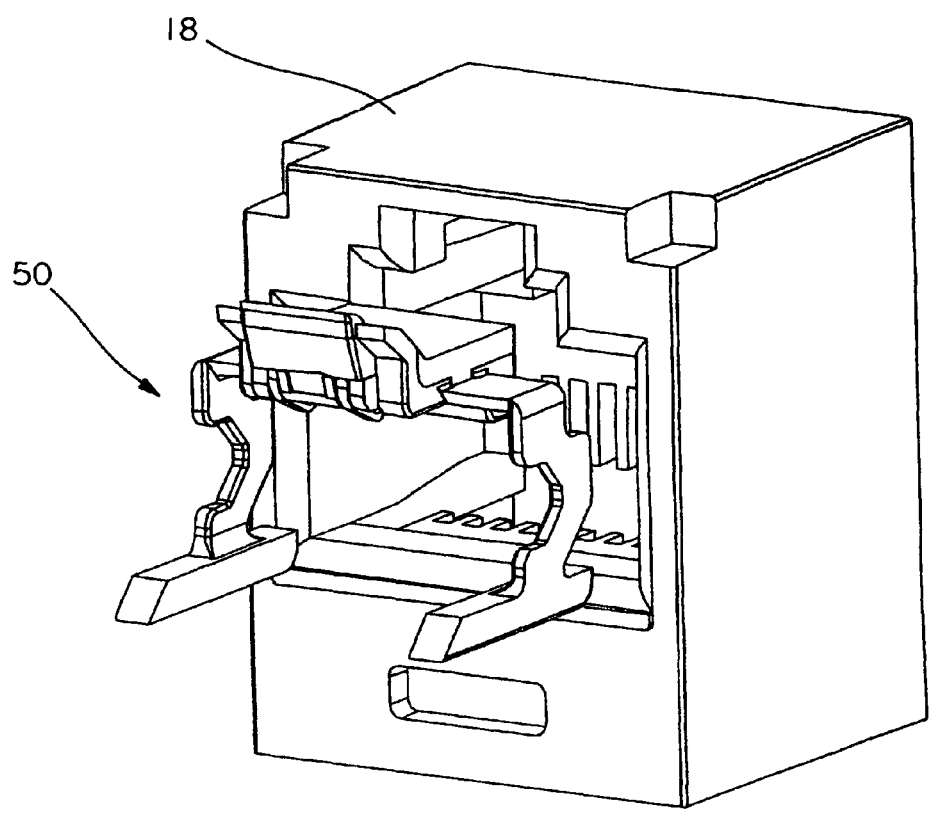

FIG. 4 shows the port ID module 50 positioned for insertion into a port 18.

Figure 5:
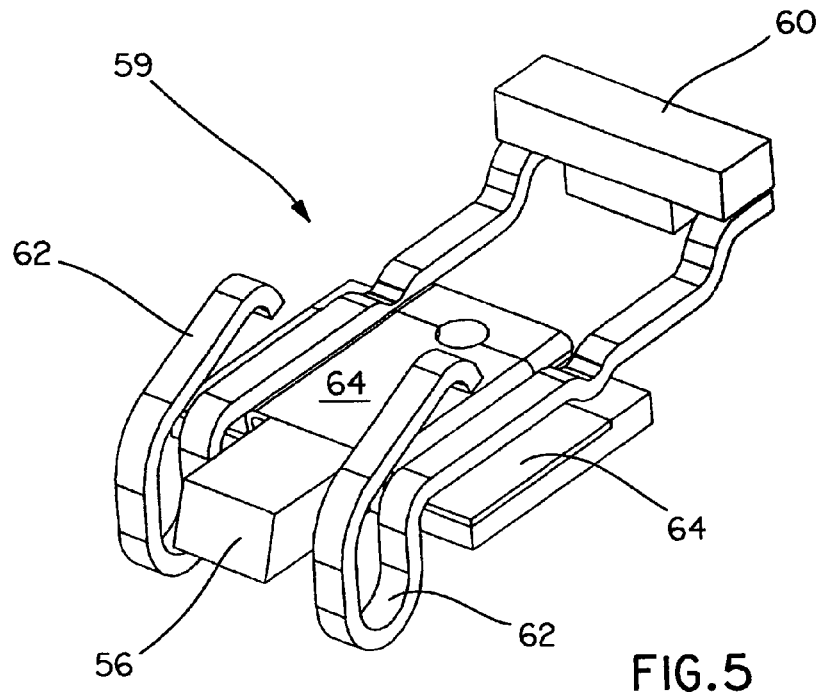
FIGS. 5 and 6 are perspective diagrams of a port ID contact assembly according to one embodiment of the current invention.

FIG. 5 shows a port ID contact assembly 59 of a port ID module. The port ID contact assembly 59 has a printed circuit board (PCB) 60, which contains the unique identification number of the port ID module. The printed circuit board 60 is connected to port ID module contacts 62, which are adapted to contact port ID module plug contacts 46 of the switch plug 25 (shown in FIGS. 1 and 2) of an intelligent interconnect patch cord 12. A slider 56 has a shorting plate 64 mounted thereon. FIG. 5 shows the slider 56 in a "non-shorting" position, which allows normal operation of the port ID module.

Figure 6:
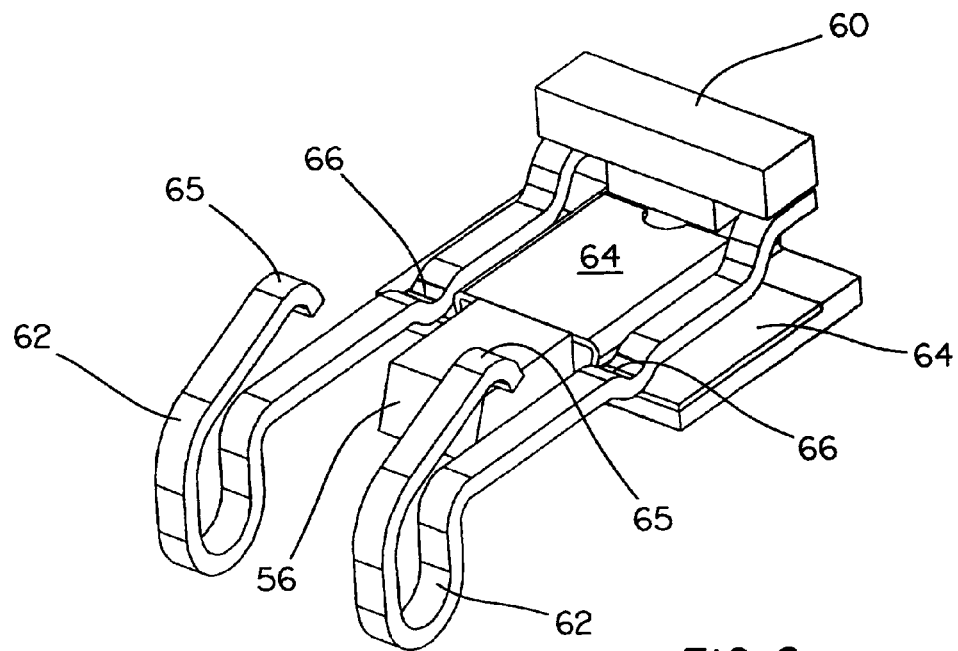

When the slider 56 is pushed backwardly into the position shown in FIG. 6, protrusions 66 of the port ID module contacts 62 are shorted together, disabling normal operation of the port ID module. The slider 56 may be pushed backwardly by a removal tool or by tampering with the port ID module 50. Bent portions 65 of the port ID module contacts 62 make contact with the port ID module plug contacts 46 of the switch plug 25 when the switch plug is inserted into a port 18 with the port ID module 50 installed.

Figure 7:
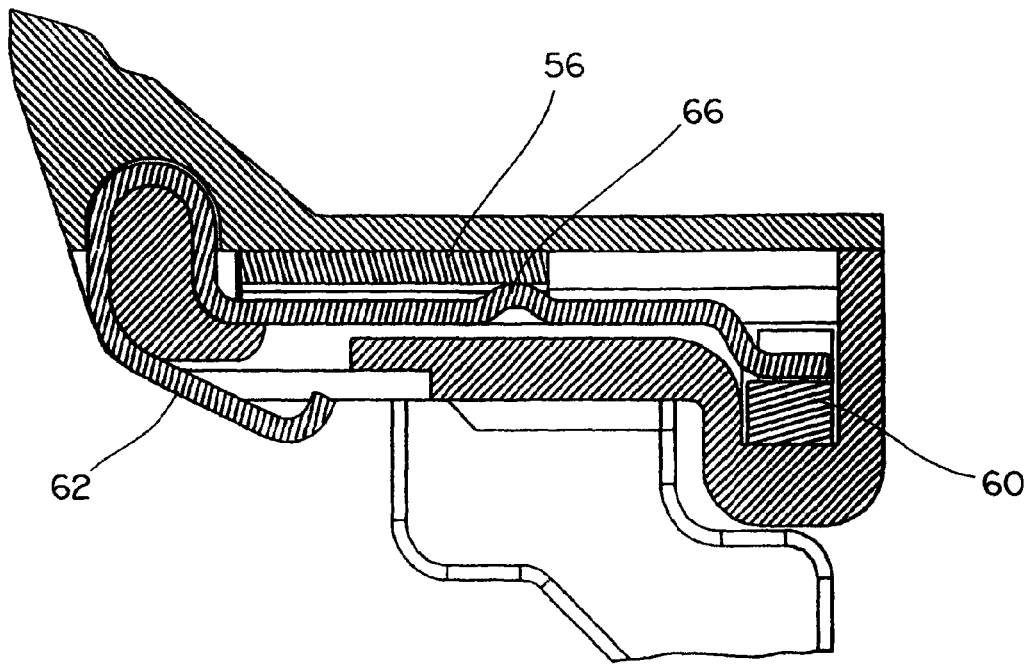
FIGS. 7-10 are sectional drawings showing the operation of a port ID module.

FIG. 7 is a cross-sectional view through a port ID module contact 62, with the slider in a forward position, allowing normal operation of the port ID module. The slider 56 exerts pressure on the protrusion 66 of the port ID module contact 62, assuring continuity between traces on the PCB 60 and the contact 62.

Figure 8:
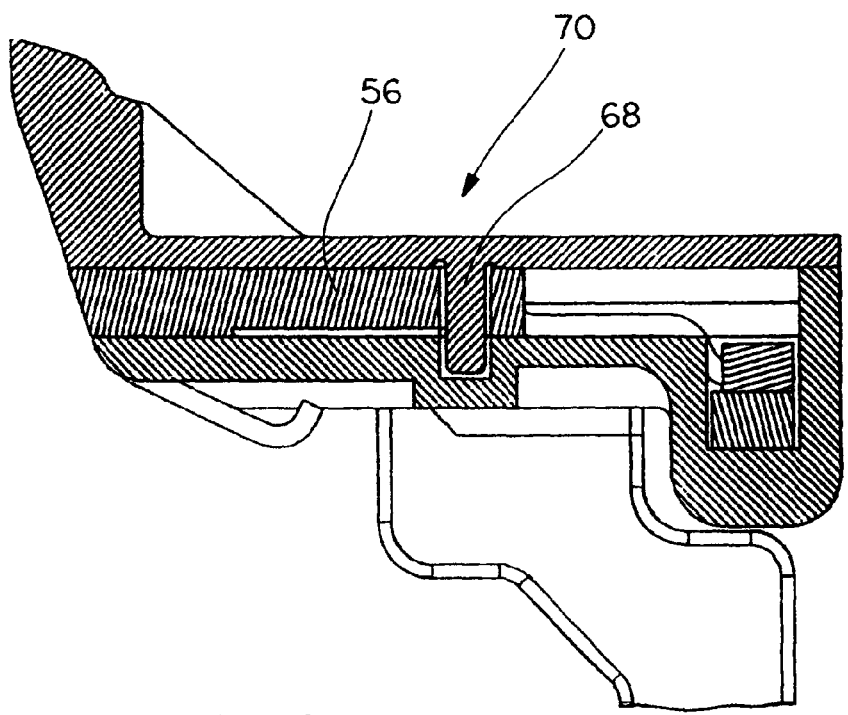
Figure 9:
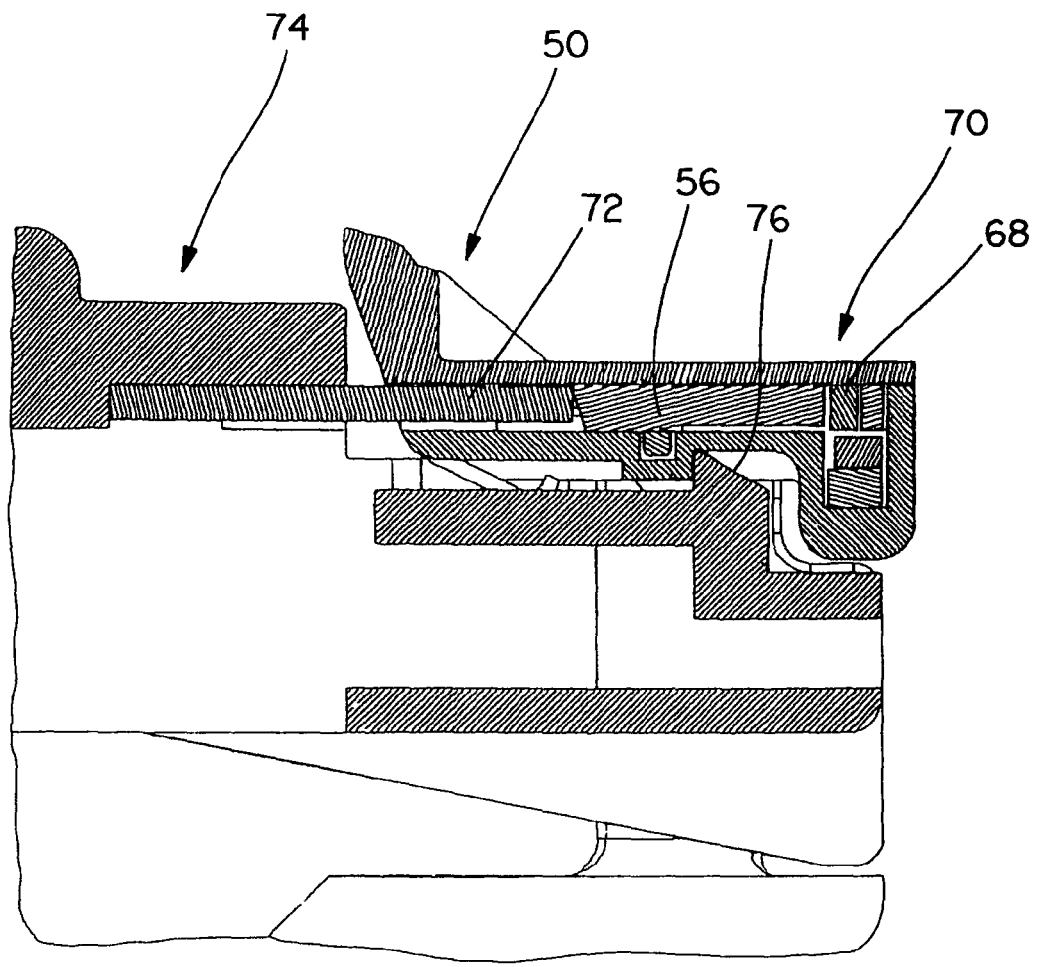
Figure 10:
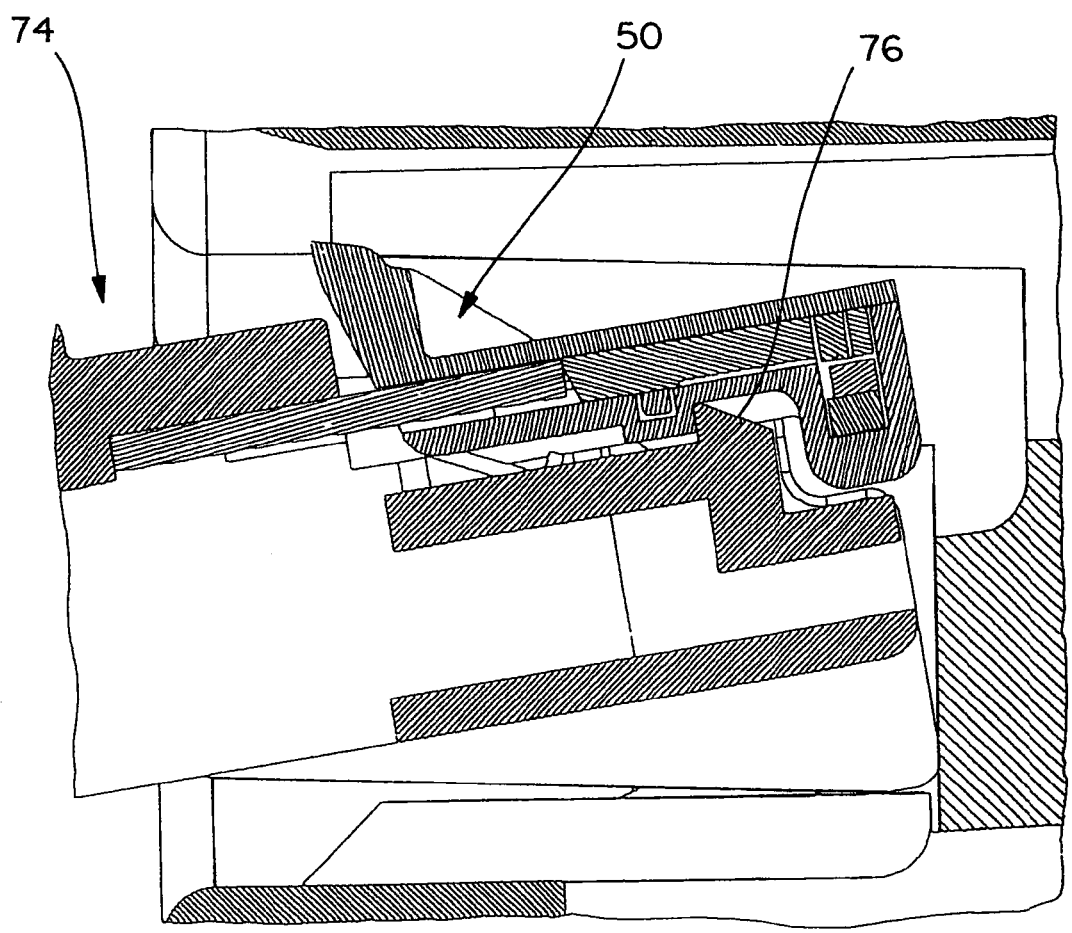
Figure 11:
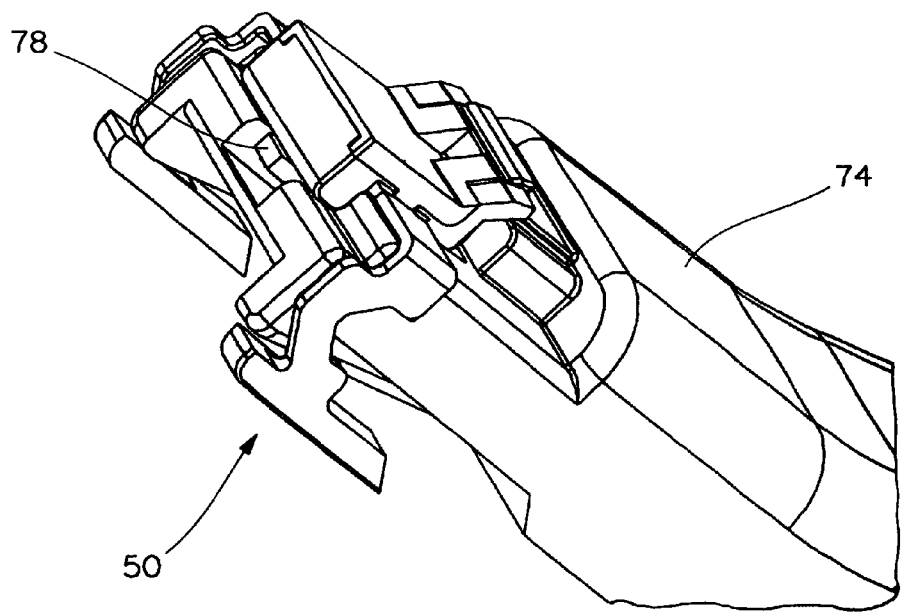
FIG. 11 is a perspective view of a port ID module and a removal tool.

FIG. 8 is a cross-sectional view through the slider 56 when the slider is in its forward, non-shorting position. A post 68 of the port ID module extends through a hole 70 in the slider 56. FIG. 9 shows the slider 56 pushed to its rear, shorting position by an extension 72 of a removal tool 74. The post 68 has been severed, and a portion of the post 68 remains in the hole 70. A latch 76 of the removal tool has engaged the port ID module, allowing the port ID module to be rotated as shown in FIG. 10 and removed from the port. FIG. 11 shows the removal tool 74 with the port ID module 50 thereon. A latch lever 78 on the removal tool can be depressed to allow removal of the port ID module 50 from the tool.

Figure 12:
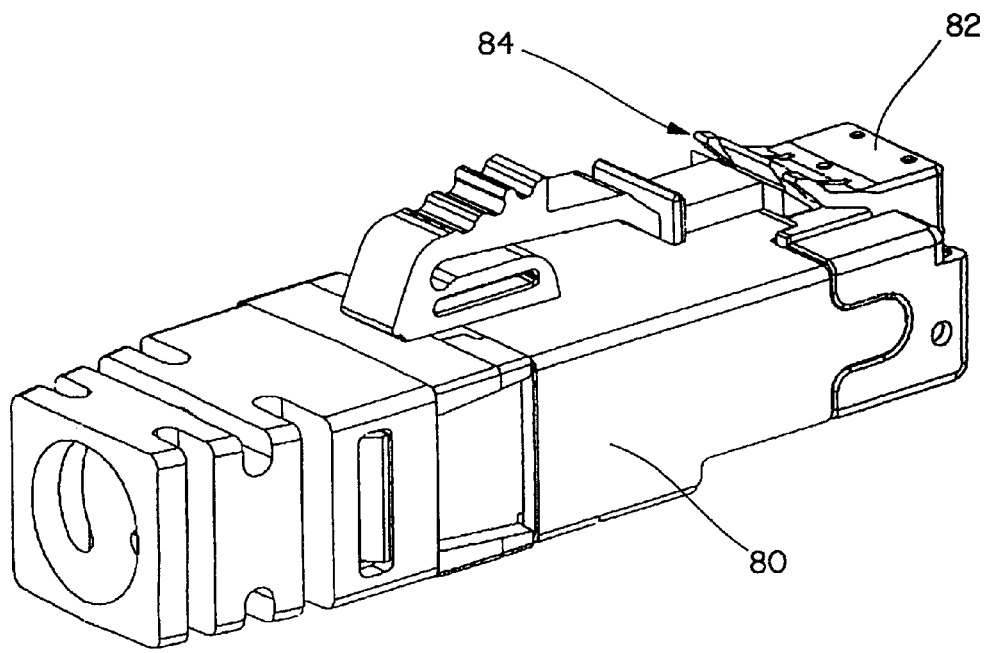
FIG. 12 is a perspective view of a switch plug with a port ID module thereon.

FIG. 12 shows a switch plug 80 according to one embodiment of an intelligent interconnect patch cord. The switch plug 80 has another embodiment of a port ID module 82 provided thereon. In the configuration shown in FIG. 12, the switch plug 80 is ready for insertion into a switch port. Following this insertion, the port ID module 82 will remain installed in the switch port, retained by latches 84.

Figure 13:
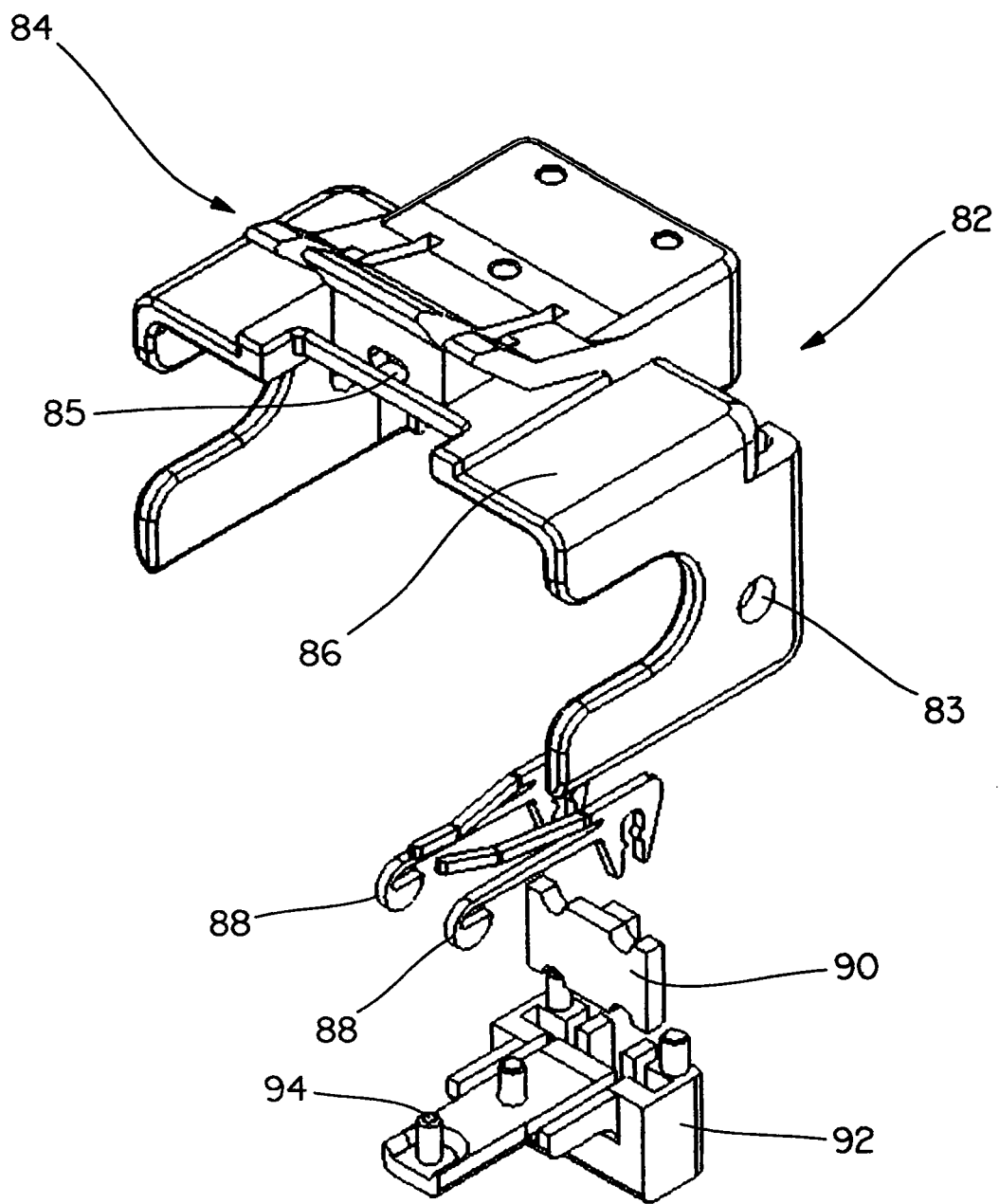
FIG. 13 is an exploded view of a port ID module of an alternative embodiment.

FIG. 13 is an exploded perspective view of another embodiment of the port ID module 82, showing a port ID module housing 86, port ID module contacts 88, a PCB assembly 90, and a PCB housing 92. The PCB assembly 90 contains the ID number of the port ID module 82, and is electrically connected to the port ID module contacts 88. In normal operation, a post 94 of the PCB housing 92 keeps the port ID module contacts 88 separated. After removal or tampering of the port ID module 82, however, the post 94 is broken, allowing the port ID module contacts 88 to short out and thereby disabling the port ID module 82.

Figure 13A:
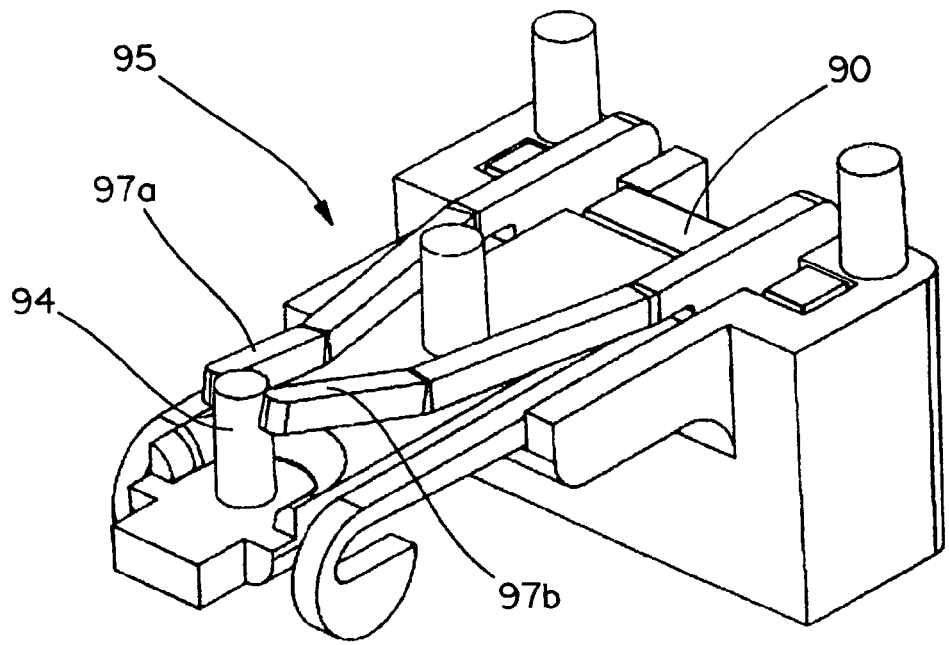
FIGS. 13a and 13b are perspective views of a contact assembly of FIG. 13.
Figure 13B:
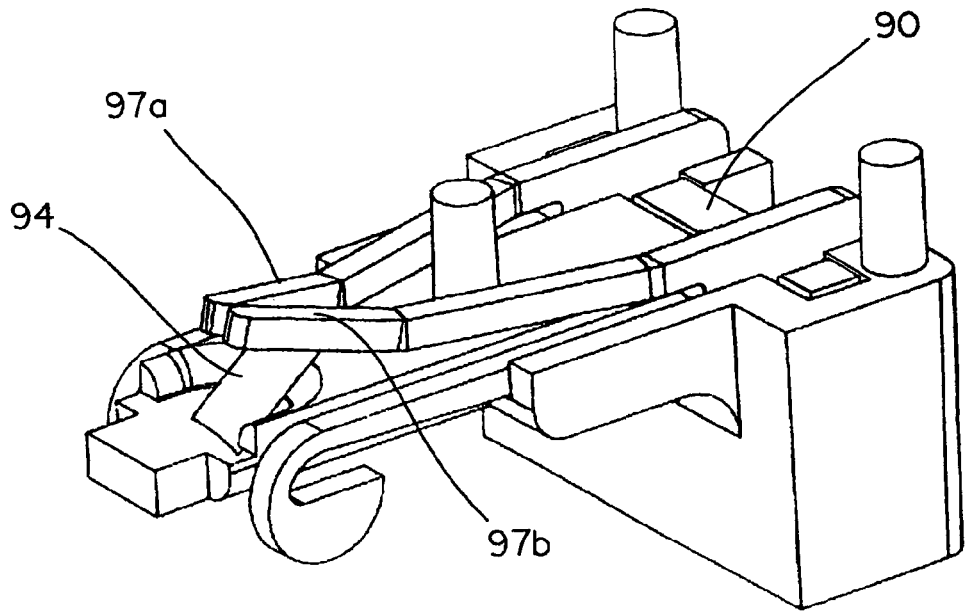

FIG. 13a shows an assembled contact assembly 95 as illustrated in FIG. 13 in an active (non-disabled) state, with the post 94 separating the contact portions 97a and 97b. FIG. 13b shows the contact assembly 95 with the post 94 broken so that the contact portions 97a and 97b are in electrical contact due to the spring force between the contact portions.

Figure 14:
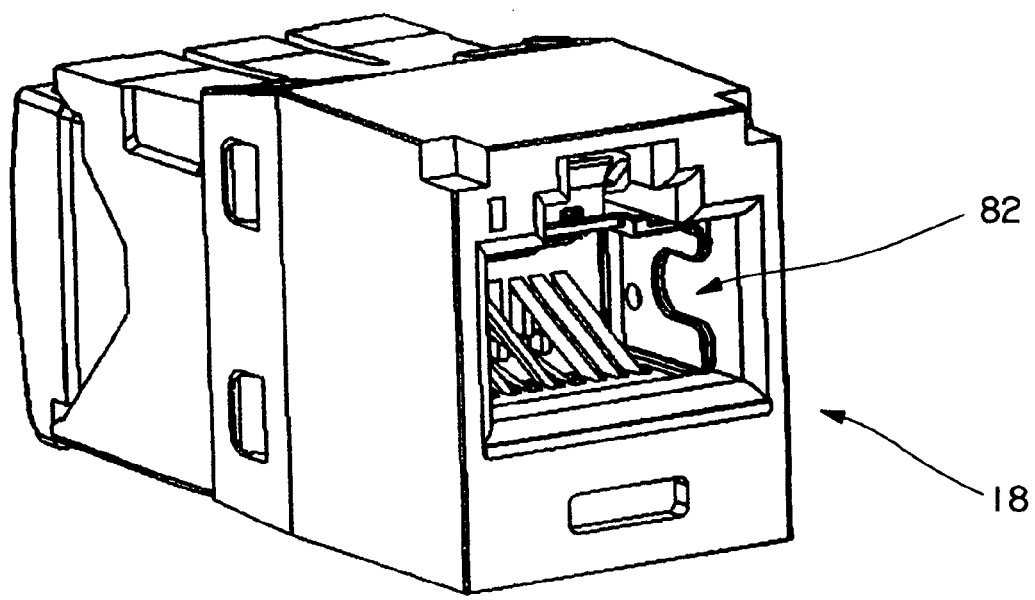
FIG. 14 is a perspective view of a port ID module inserted into a port.

FIG. 14 shows the port ID module 82 installed within a port 18.

Figure 15:
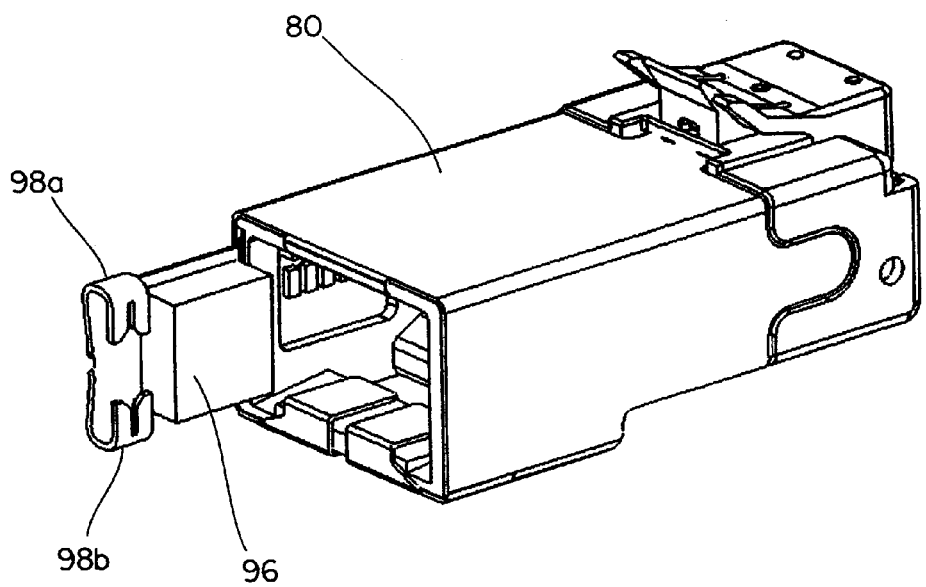
FIG. 15 is a perspective view of a switch plug of an intelligent interconnect patch cord having a port ID module thereon.

FIG. 15 is a perspective view of the switch plug 80, in which a PCB 96 supporting the patch cord microcontroller 48 is visible. First and second contacts 98a and 98b allow the PCB 96 to electrically communicate with the intelligent interconnect patch panel via the out-of-band conductors 38 of the intelligent interconnect patch cord.

Figure 16:
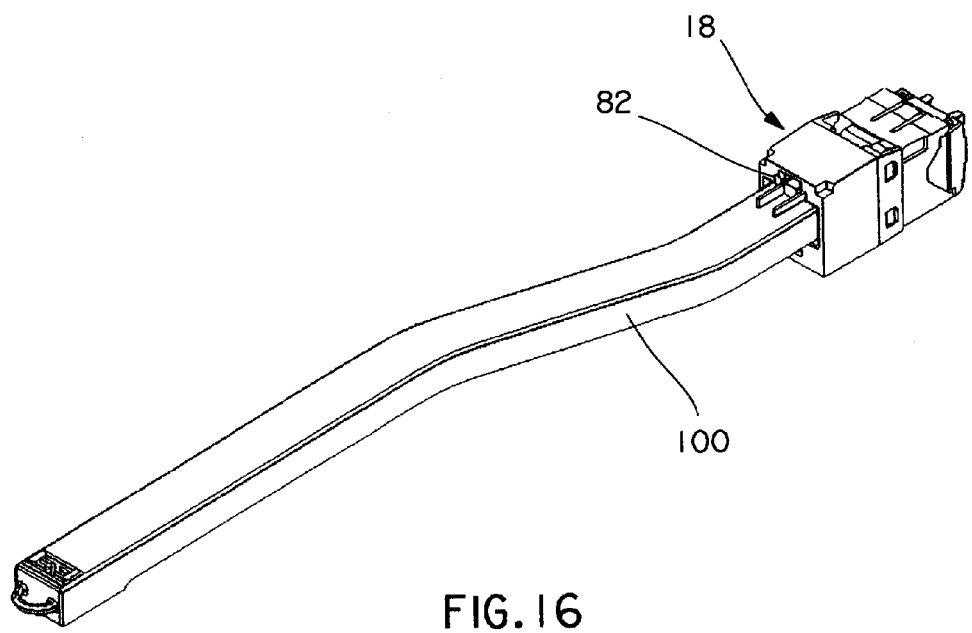
FIG. 16 is a perspective view of a removal tool positioned for removal of a port ID module.

FIG. 16 is a perspective view of a removal tool 100 positioned to remove a port ID module 82 from a port 18.

Figure 17:
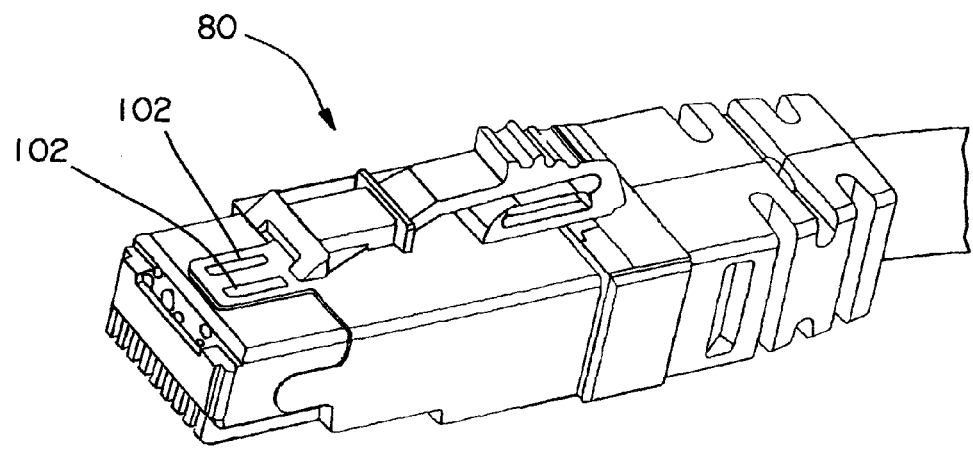
FIG. 17 is a perspective view of a switch plug showing port ID module plug contacts.

FIG. 17 is a perspective view of the switch plug 80 without a port ID module attached. Port ID module plug contacts 102, which make electrical contact with the port ID module contacts 88, are shown.

Figure 18:
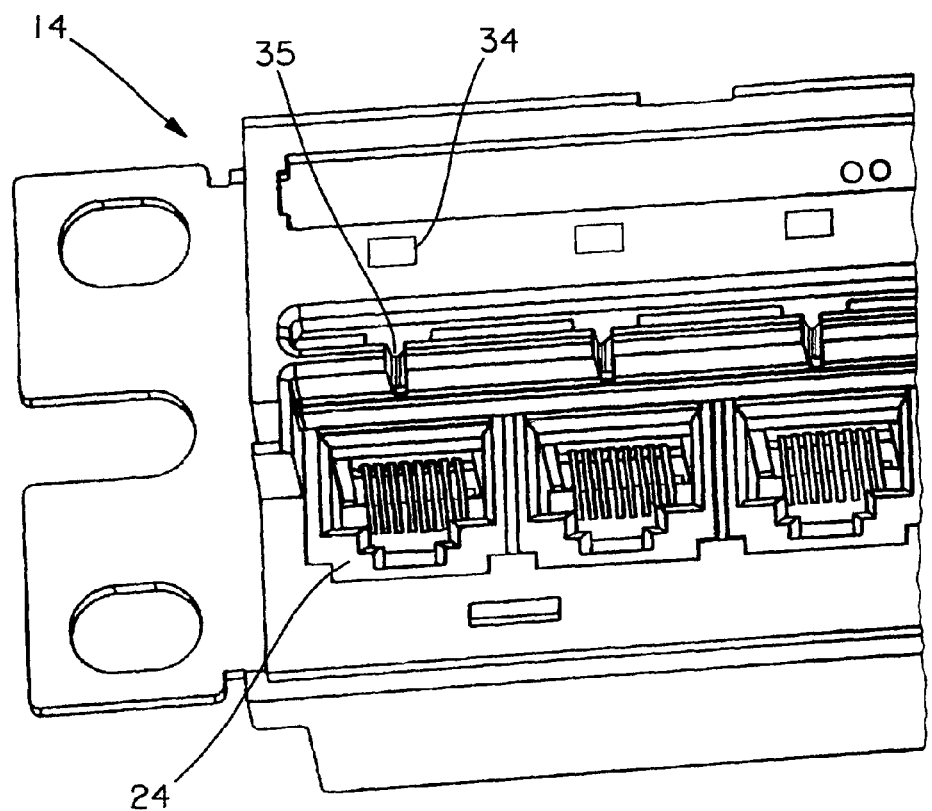
FIG. 18 is a perspective view of the face of an intelligent interconnect patch panel.

FIG. 18 is a perspective view of the face of an intelligent interconnect patch panel 14, showing an intelligent interconnect patch panel port 24 and its associated LED 34. Intelligent interconnect patch panel contacts 35 are positioned above the port 24 and are adapted for connection with the intelligent interconnect patch panel plug contacts 42 (shown in FIG. 2). This allows communication between the intelligent interconnect patch panel 14 and port ID modules according to the present invention. The LED 34 and the LEDs 32 of the intelligent interconnect patch cord may be used by the system to guide a technician to the location of a required action and indicate correct or incorrect cable connections to a technician. This may be done by changing the on/off state of the LEDs, using different flashing rates, and/or using different colors for the LEDs.

Figure 19:
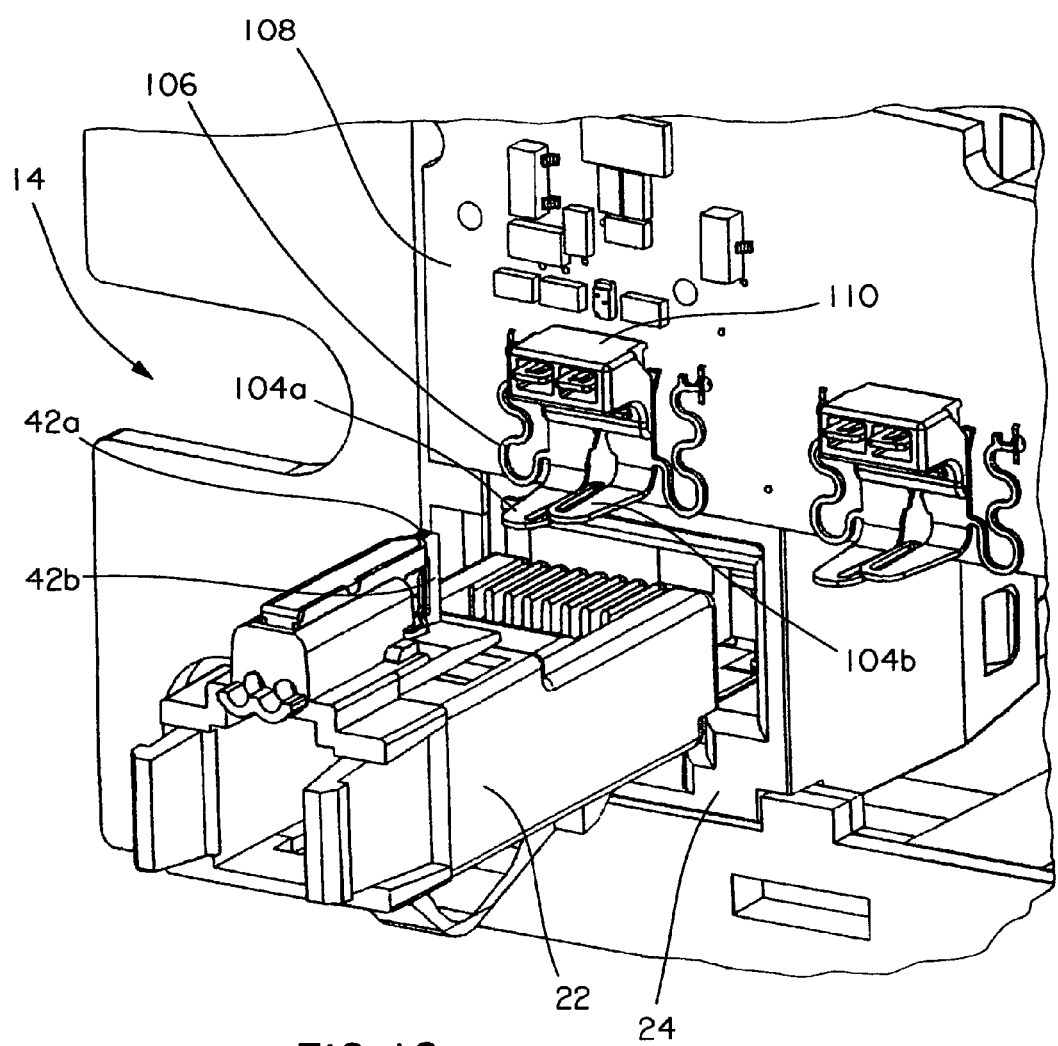
FIG. 19 is a perspective view of an intelligent interconnect patch panel port showing its contacts, and a plug positioned for insertion into the port.

FIG. 19 is a perspective view of an intelligent interconnect patch panel port 24. Intelligent interconnect patch panel port contacts 104a and 104b are located above the port 24. The intelligent interconnect patch panel port contacts 104a and 104b enable electrical connection between the intelligent interconnect patch panel 14 and the out-of-band conductors 36 of an intelligent interconnect patch cord. The contacts 104a and 104b are vertically offset, and they are adapted to contact intelligent interconnect patch panel plug contacts 42a and 42b of the intelligent interconnect patch panel plug 22. The intelligent interconnect patch panel port contacts 104a and 104b are provided with flexible members 106, which are electrically connected to a PCB 108 of the intelligent interconnect patch panel 14, and the contacts are held in place by a contact housing 110. The housing 110 and the flexible members 106 hold the contacts 104a and 104b in place, allowing some freedom of movement for the contacts 104a and 104b, while assuring adequate contact force on the plug contacts 42a and 42b.

Figure 20:
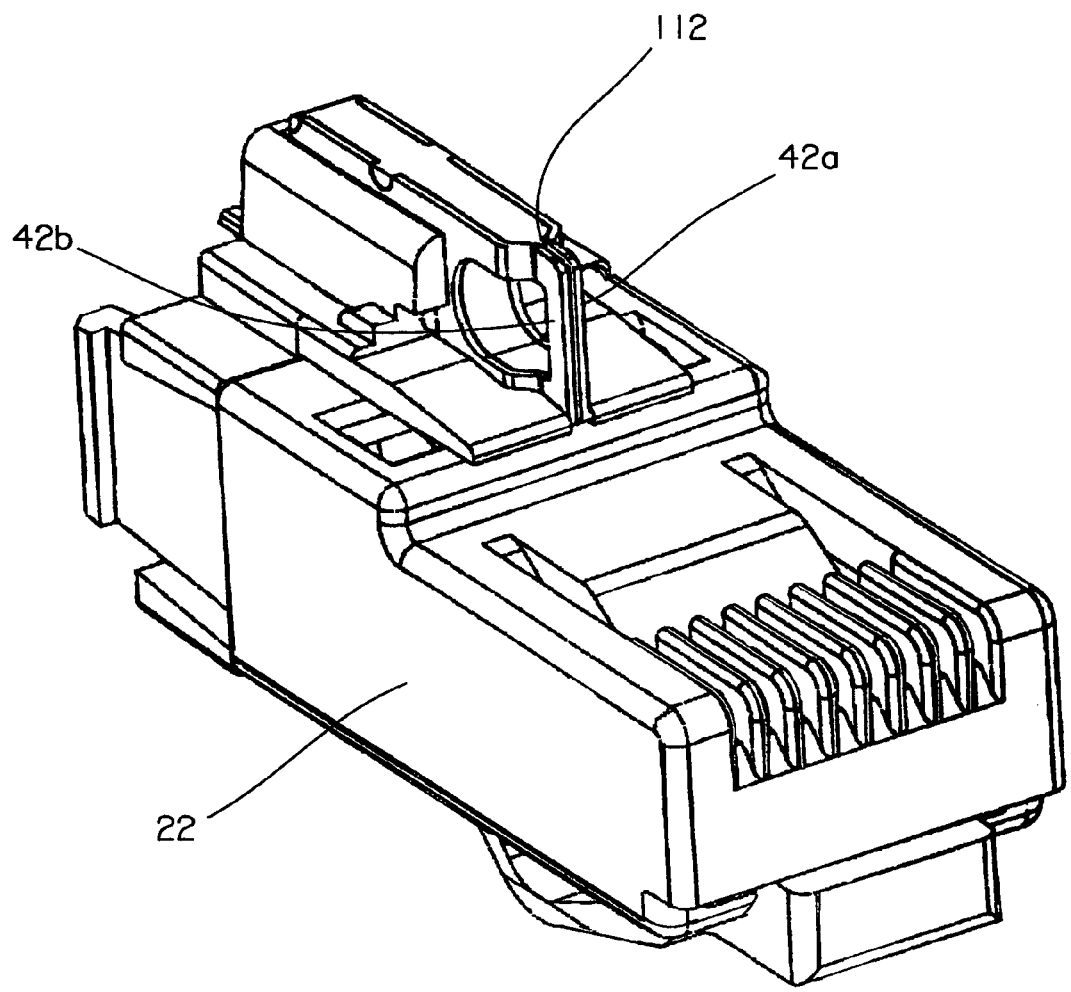
FIG. 20 is a perspective view of an intelligent interconnect patch panel plug according to one embodiment of the present invention.

FIG. 20 is a perspective view of a patch panel plug 22, showing the intelligent interconnect patch panel plug contacts 42a and 42b. The contacts 42a and 42b are separated from one another by an insulative layer 112, and are respectively connected to first and second out-of-band conductors 38 (not shown in FIG. 20).

Figure 21:
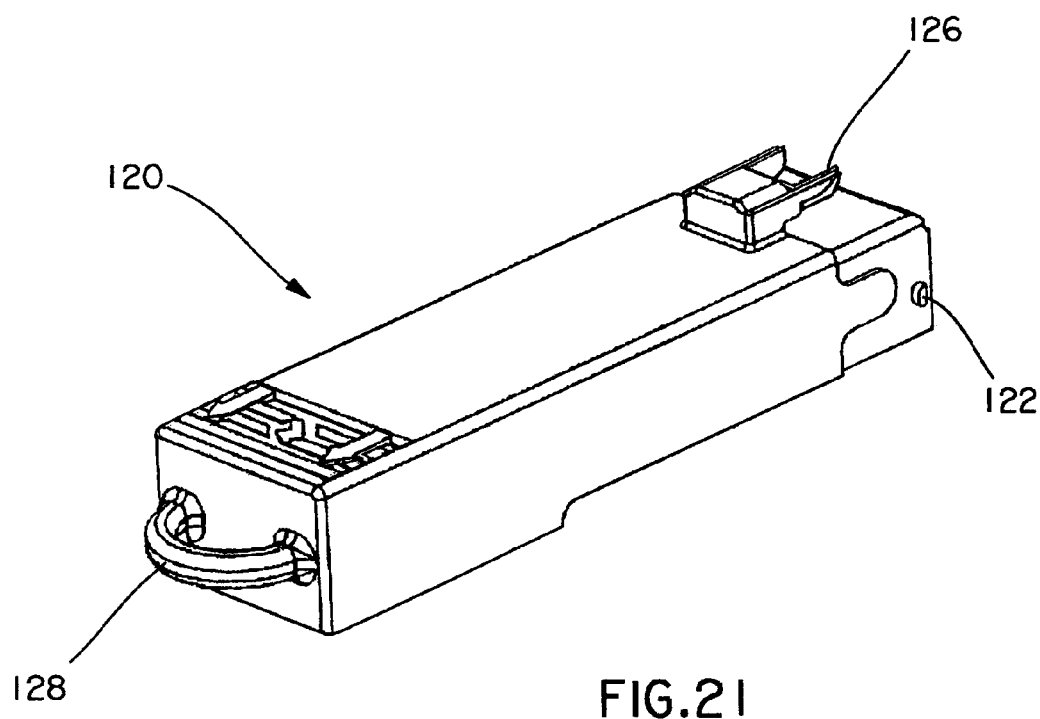
FIGS. 21 and 22 are perspective views of a port ID module removal tool according to one embodiment of the current invention.
Figure 22:
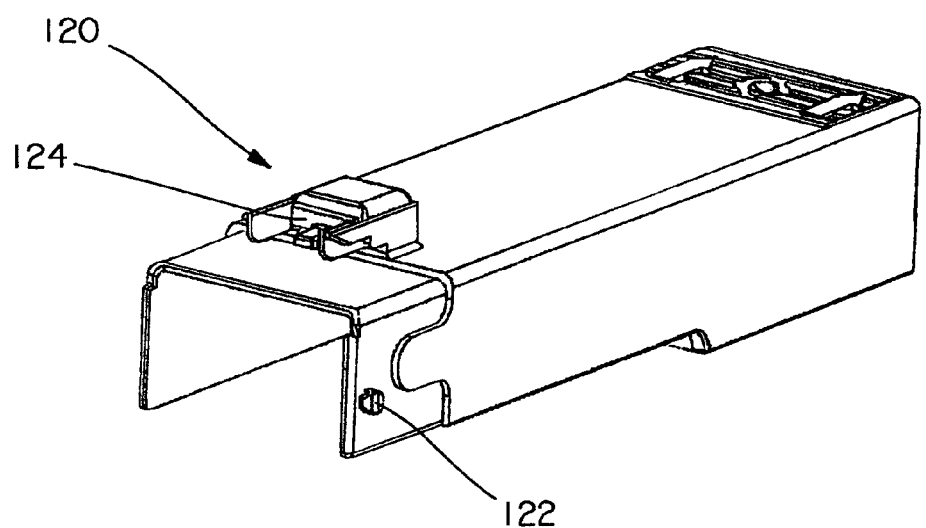
Figure 23:
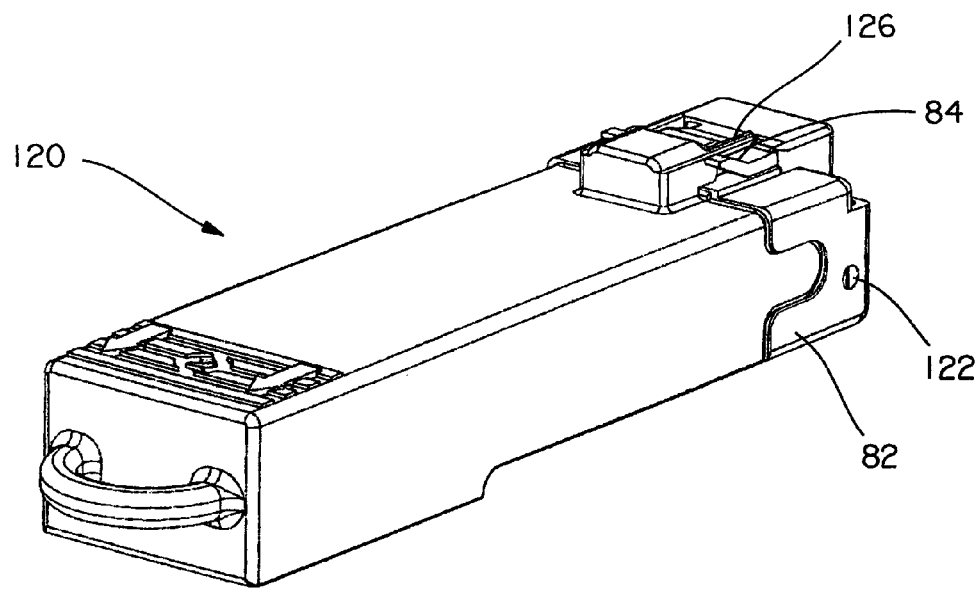
FIG. 23 is a perspective view of a port ID module removal tool with a port ID module thereon.
Figure 24:
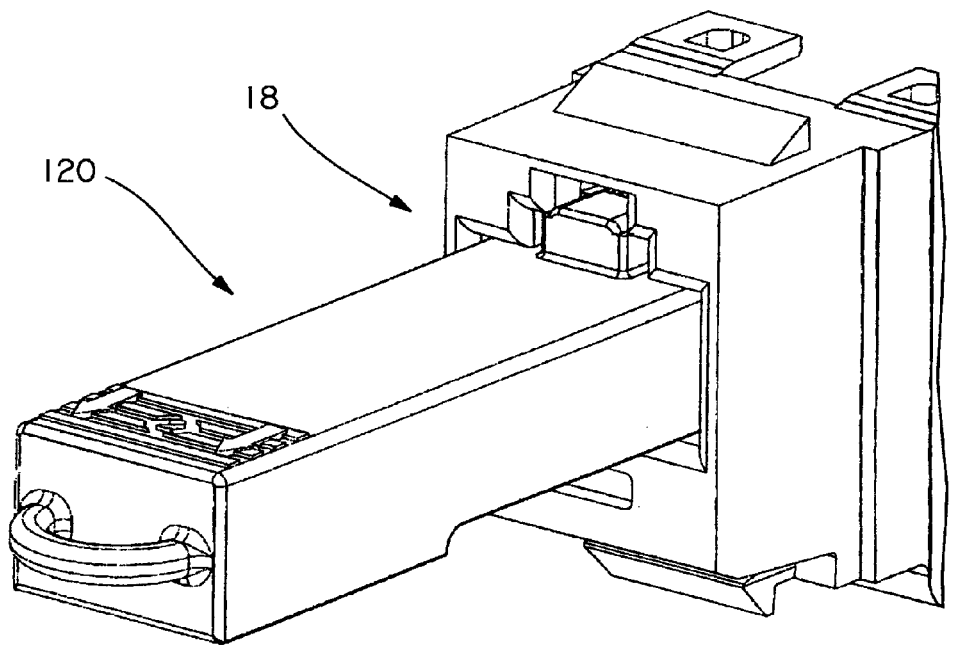
FIG. 24 is a perspective view of a port ID module removal tool in use.

FIGS. 21 and 22 show an alternative embodiment of a port ID module removal tool 120, for use with the port ID module 82 shown in FIG. 13. Latch members 122 engage holes 83 of the port ID module 82, such that the port ID module 82 becomes latched onto the removal tool 120. A protrusion 124 is inserted into a hole 85 in the module 84 to break the post 94 and disable the module 84. Sliders 126 disengage latches 84 to allow removal of the module 84 from a port. A handle 128 is provided to allow easier use by a technician. FIG. 23 shows a port ID module 84 on the end of a port ID removal tool 120, and FIG. 24 shows the port ID removal tool 120 inserted into a port 18 during the removal process.

As will be understood from the above, the following are among the benefits of the present invention:

Easy installation;

Real-time protection against errors or intrusion, even following a power interruption;

The systems are compact;

The systems provide move, add, and change (MAC) guidance to technicians;

No additional cables dedicated to management functions are required;

The system is self-documenting;

There are no scanning delays in the system;

There is no effect on in-band signals or Power Over Ethernet (POE);

Disconnection of either plug of a patch cord is immediately detected; and

Systems may be used in high-density switch port environments.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention. For example, while port ID modules have been shown inserted into switch ports, it is to be understood that port ID modules may be inserted into other types of communications ports.

The invention claimed is:

1. A system for identifying ports in a communication system, comprising:
    a network switch having a plurality of network switch ports;
    an intelligent interconnect patch panel having a plurality of patch panel ports;
    at least one intelligent interconnect patch cord connected between one of said network switch ports and one of said patch panel ports; and
    a plurality of port ID modules, each of said port ID modules being inserted within one of said network switch ports and having a unique port ID code associated therewith.

2. The system of claim 1 wherein said intelligent interconnect patch cord comprises at least two out-of-band conductors.

3. The system of claim 2 wherein said intelligent interconnect patch cord comprises a switch plug and a patch panel plug.

4. The system of claim 3 wherein said out-of-band conductors are in electrical communication with port ID module plug contacts of said switch plug of said intelligent interconnect patch cord.

5. The system of claim 4 wherein each of said port ID modules comprises port ID module contacts that are adapted to be in electrical contact with said port ID module plug contacts of said switch plug of said intelligent interconnect patch cord.

6. The system of claim 1 wherein said intelligent interconnect patch panel comprises a patch panel microcontroller adapted to receive said unique port ID code of a port ID module when said intelligent interconnect patch cord is plugged into a switch port having said port ID module installed therein.

7. The system of claim 1 wherein each of said port ID modules comprises a printed circuit board on which said unique port ID code is stored.

8. The system of claim 7 wherein each of said port ID modules comprises two port ID module contacts electrically connected to said printed circuit board.

9. The system of claim 8 wherein said port ID module contacts may be shorted together in a disabling operation.

10. The system of claim 9 wherein said disabling operation results when one of said port ID modules is tampered with or removed from its corresponding switch port.

* * * * *